Sept. 2, 1930.   J. H. LAWRENCE   1,774,604
GAS CLEANING APPARATUS
Filed March 27, 1925

Inventor
John H. Lawrence
By his Attorney
/. Anthony Usina

Patented Sept. 2, 1930

1,774,604

UNITED STATES PATENT OFFICE

JOHN H. LAWRENCE, OF NEW YORK, N. Y., ASSIGNOR, BY MESNE ASSIGNMENTS, TO METROPOLITAN ENGINEERING CORPORATION, OF NEW YORK, N. Y., A CORPORATION OF NEW YORK

GAS-CLEANING APPARATUS

Application filed March 27, 1925. Serial No. 18,708.

My invention aims to provide certain improvements in apparatus for cleaning gases or precipitating dust therefrom whereby compactness and efficiency are secured. The accompanying drawings illustrate more or less diagrammatically an embodiment of the invention.

Figure 1:
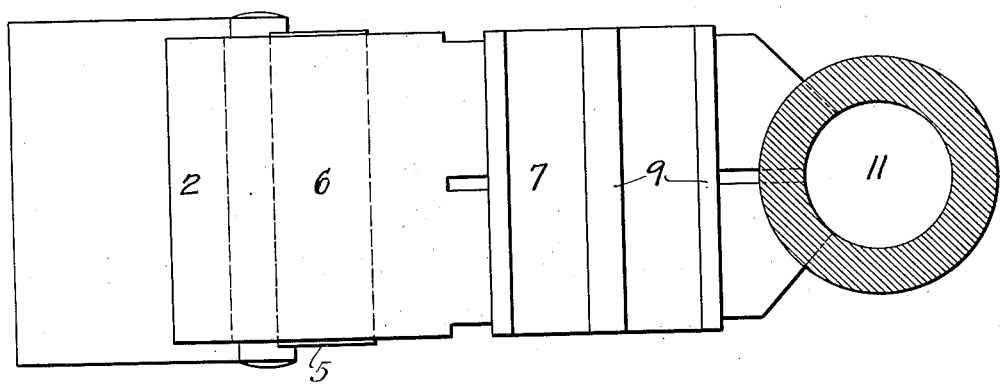
Figure 2:
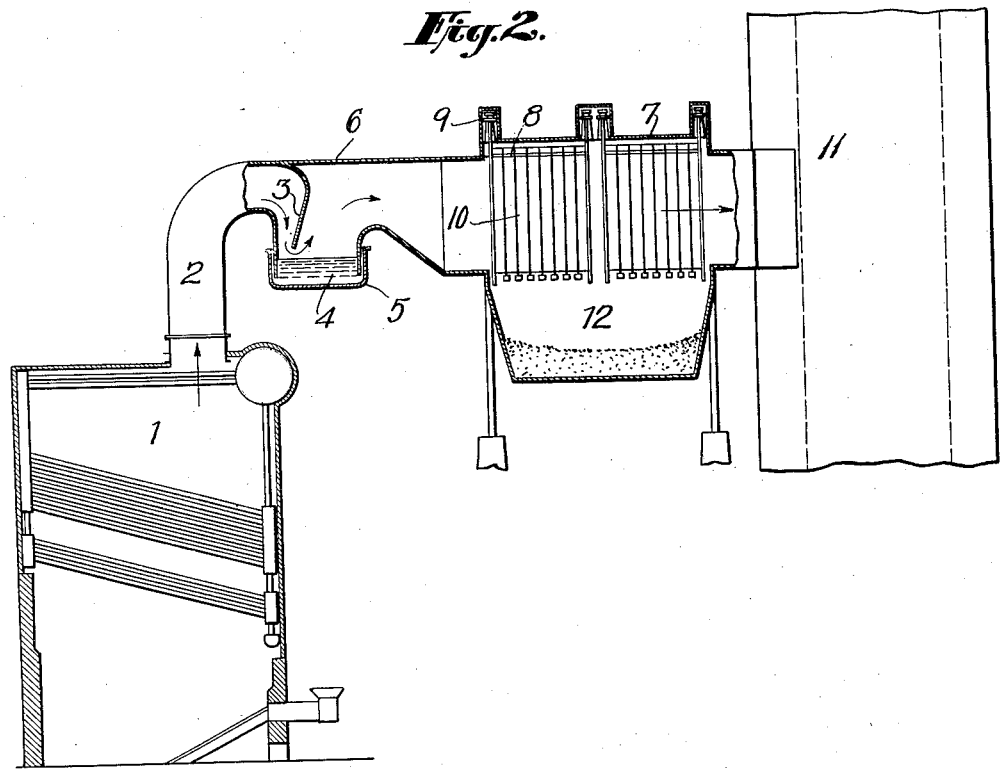

Fig. 1 is a plan and Fig. 2 is a side elevation partly in section.

The invention is particularly useful in cleaning the flue gases from a boiler furnace and is illustrated in this connection. A boiler is illustrated at 1 with a flue 2 for carrying off the gases. From this flue the gases pass to a wet cinder catcher of known type. In the path of the gases there is a baffle 3 (or there may be a plurality of such baffles) which deflects the gases down on to the surface of a body of water 4 in a tank 5 extending across the bottom of the casing 6. The chamber 6 is widened in the vertical direction at its outlet and leads to an electric dust precipitator, also of a known type.

Within the casing 7 of this precipitator are bars 8 suspended at their ends from insulators 9 and supporting at their upper ends vertical rods 10 constituting electrodes which are charged with electricity by any usual or suitable apparatus. From the casing 7 of the electric dust precipitator the clean gases pass out to a stack 11. The electrodes are shaken at intervals so as to cause the dust to drop into a pan 12 below the casing from which they are removed from time to time.

The cinders and coarser particles of dust are caught in the wet apparatus, and the finer particles in the electric apparatus. I propose to proportion these two apparatus so that from 75% to 95% of the work is done in the wet apparatus. But for cleaning other gases, or for cleaning the gases from the flues of other designs of boiler, the two cleaning apparatus may be differently proportioned.

The wet cinder catcher is not adapted to remove fine particles of dust efficiently, these being carried by the current of gases past the water trap without being caught. An electric precipitator alone for doing about the same amount of work would require very much more space than is occupied by the combination which I have provided. Therefore, my combination apparatus in a smaller total size will do the work of a larger electric precipitator; or for the same size the work will be done more efficiently.

Also the arrangement of the wet apparatus in advance of the electric precipitator is of special importance in treating flue gases from a furnace. Such gases are normally very dry, so as to be poorly adapted to electric precipitation. The passage through the wet apparatus serves to condition the gases by the addition of moisture, which increases the efficiency of the electric apparatus. In the use of such electric apparatus alone in fact, I have found that the efficiency is increased if I condition the gases by injecting steam thereinto in advance of the precipitator.

Though I have described with great particularity of detail a certain embodiment of my invention, yet it is not to be understood therefrom that the invention is restricted to the particular apparatus illustrated. Various modifications thereof may be made by those skilled in the art without departing from the invention as defined in the following claims.

What I claim is:—

1. A cleaning apparatus for furnace flue gases comprising a passage for said gases, a water container in said passage, a baffle to direct gases in said passage against the surface of said water to collect and quench cinders and the larger particles suspended in the gases passing through said passage, and an electric dust precipitator positioned to receive the gases from said passage.

2. A cleaning apparatus for furnace flue gases comprising a passage for said gases, a water container exposing a continuous surface to gases passing through said passage, means to direct gases in said passage against the surface of said water to collect and quench cinders and the larger particles suspended in the gases passing through said passage, and an electric dust precipitator positioned to receive the gases from said passage.

In witness whereof, I have hereunto signed my name.

JOHN H. LAWRENCE.